United States Patent [19]
Horton

[11] 3,915,503
[45] Oct. 28, 1975

[54] AUTOMOBILE WHEEL
[76] Inventor: William E. Horton, 711 Sunset Road, Henderson, Nev. 89015
[22] Filed: June 26, 1974
[21] Appl. No.: 483,147

Related U.S. Application Data
[63] Continuation of Ser. No. 354,308, April 25, 1974, abandoned.

[52] U.S. Cl. .............................. 301/39 T; 152/342
[51] Int. Cl.² .......................................... B60B 11/00
[58] Field of Search .......... 301/13 R, 13 SM, 36 R, 301/38 R, 39 R, 39 T, 40 R, 40 S; 152/331, 333, 334, 337, 338, 339, 342

[56] References Cited
UNITED STATES PATENTS

| | | | |
|---|---|---|---|
| 2,127,075 | 8/1938 | Venosta | 152/342 |
| 2,756,800 | 7/1956 | Riggs | 152/342 |
| 3,155,429 | 11/1964 | Metzler | 301/39 T |
| 3,463,552 | 8/1969 | Colletti | 301/39 T |

Primary Examiner—Lloyd L. King
Assistant Examiner—D. W. Keen
Attorney, Agent, or Firm—Richards, Harris & Medlock

[57] ABSTRACT

Disclosed is a wheel for attachment to the axle of a vehicle having a rim with a pair of mounting surfaces formed on the periphery of the rim for attaching a pair of pneumatic tires in a spaced parallel relationship. A flange is located between the mounting surfaces and extends radially outward between the tires. A cylindrical contact surface formed on the exterior of the flange carries a tread thereon. An inwardly extending flange is provided with bores for attaching the rim to lug bolts of a vehicle axle. A pair of inflation check valves are attached to the rim to communicate respectively with the interior of each of the pneumatic tires. A flow passage is provided in the rim interconnecting the pneumatic tires for allowing restricted air flow therebetween.

4 Claims, 3 Drawing Figures

AUTOMOBILE WHEEL

BACKGROUND OF THE INVENTION

This application is a continuation of application, Ser. No. 354,308, filed Apr. 25, 1974, now abandoned entitled "Automobile Wheel."

The present invention relates generally to safety wheels for use on vehicles. In another aspect, the present invention relates to safety wheels used in attaching pneumatic tires to vehicles which minimizes the danger resulting from blowout of the tires.

In the design of wheeled vehicles, such as automobiles, trucks, trailers, and the like, it has been common to use pneumatic tires to obtain a smooth and comfortable ride. These pneumatic tires are conventionally mounted on the exterior of a metallic rim and are inflated through a check valve attached to the rim. The tires are conventionally constructed with an outer wall constructed from a flexible material.

Although these pneumatic tires are quite satisfactory in providing a soft and comfortable ride, they have not been entirely satisfactory under all conditions of service. One undesirable aspect is that if a sharp object inadvertently comes into contact with a tire, a hole or puncture can be formed in the tire allowing the tire to deflate, suddenly reducing the tire's effective radius. This sudden reduction in the effective radius of the tire when the vehicle is moving at a high rate of speed can make steering and control difficult, if not impossible during the dangerous period while the vehicle is decelerated to a safe speed. In addition, damage can be caused to the tire by being compressed between the rim and the roadway during the bringing of the automobile to a halt. Also, movement of the vehicle to a safe place where the tire may be removed is difficult with these conventional tires.

SUMMARY OF THE INVENTION

Therefore, according to the present invention, an improved safety wheel is provided having a pair of parallel mounted pneumatic tires thereon and a flange which extends substantially outward between the pair of pneumatic tires to support the vehicle when the tires become deflated and prevent damage to the tires.

The present invention also contemplates the use of a restricted flow passage interconnecting the two tires to allow the tires to be maintained at a common pressure during use and to provide a slow letdown upon failure of a tire.

The present invention also contemplates the use of a support flange which is positioned centrally of the wheel to provide easy control of the wheel with the tires deflated.

More particularly, the present invention contemplates the use of a rim having a pair of annular pneumatic tire mounting surfaces for supporting a pair of pneumatic tires in a spaced parallel relationship. An inwardly extending flange is provided with rim for connecting the rim to the axle of an automobile. A radially extending flange is provided on the rim between the tires to extend a substantial distance for supporting the vehicle when the tire is deflated. A restricted flow passage interconnects the two pneumatic tires to maintain the tires at an equal pressure and to allow a controlled deflation of the tires if one of the tires should be punctured or blown out. A pair of inflation valves is provided in the rim for separately inflating the tires.

The present invention will be readily appreciated by those of ordinary skill in the art as the same becomes better understood by reference to the following detailed description when considered in conjunction with the accompanying Drawings in which:

DESCRIPTION OF THE PREFERRED EMBODIMENTS

Figure 1:
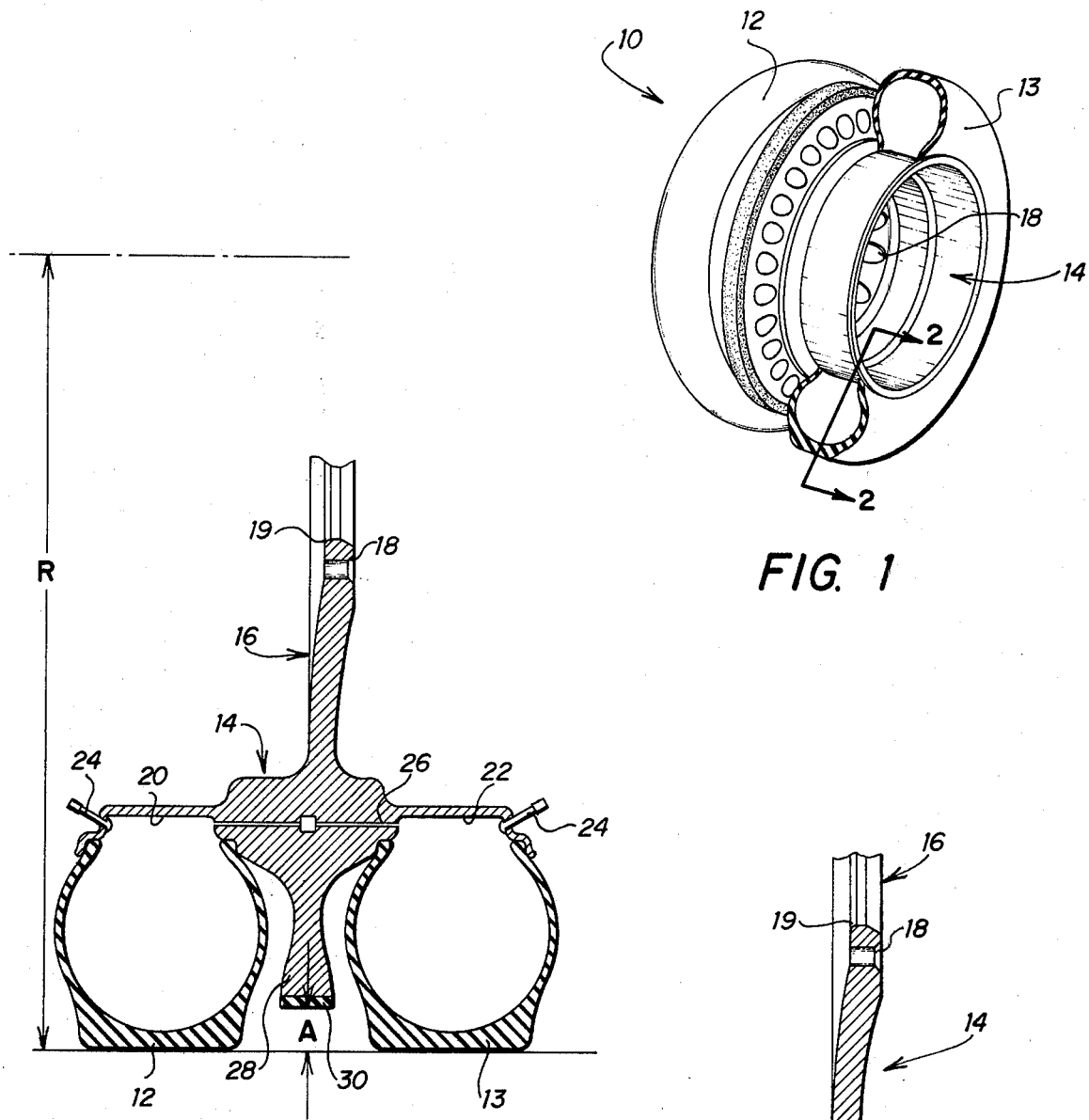
FIG. 1 illustrates a perspective view of the improved wheel of the present invention shown partly in sections.

Referring now to the Drawings wherein like reference characters designate like or corresponding parts throughout the several views, there is illustrated in the Figures, an improved wheel which for purposes of description is generally identified by reference numeral 10. The wheel 10 has two conventional pneumatic tires 12 and 13 mounted on an improved rim 14. The tires are conventional in design and their size is selected by the particular use of the wheel 10. As will be particularly pointed out hereinafter, the wheel is designed to protect against sudden collapse of the tire due to a blowout, or the like, during use.

The rim 14 has an internally extending annular flange 16 for attaching the rim to an axle of a vehicle such as an automobile. The flange 16 has a plurality of bores 18 for connection to the lug bolts of an axle. A central clearance opening 19 is formed in the flange 16 to provide clearance for the bearings of the axle.

A pair of parallel spaced tire mounting surfaces 20 and 22 are provided on the exterior of the rim 14 to allow mounting, respectively, of tires 12 and 13. Surfaces 20 and 22 are conventional in design and are provided with suitable ridges for receiving the tires 12 and 13 and to mount the same on the rim 14. A pair of conventional tire inflation check valves 24 are mounted in the wall of the rim 14 for use in inflating the tires 12 and 13. These inflation valves 24 are conventional valve stems which can be connected to a source of pressurized air to cause air to enter the interior of the tire while preventing the escape of air after the source of high-pressure air is removed.

A port or passageway 26 is provided in the rim 14 connecting the interior of the two tires 12 and 13. This passageway is restricted in size to control the rate of flow of air therethrough. The passageway 26 is of such a size so that an equal pressure will be maintained in the tires 12 and 13 during operation thereof. In the present embodiment, the passageway 26 had a minimum diameter of about 1/64 of an inch for low-pressure tires and about 1/16 of an inch for high-pressure tires.

Figure 2:
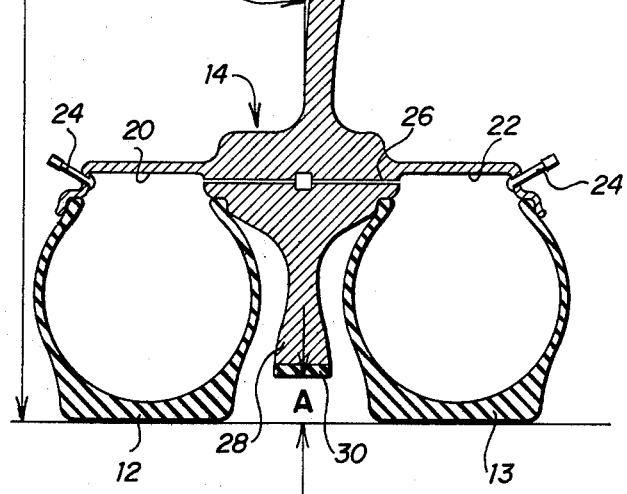
FIG. 2 illustrates a section of the device taken along line 2—2 of FIG. 1, looking in the direction of the arrows.

According to a particular feature of the present invention, a radially extending flange 28 is formed on the rim 14 to extend from the exterior thereof. The flange 28 is positioned to extend between the tires 12 and 13. The effective radius R of the inflated wheel 10 is shown and the flange 28 extends to the proximity of the roadway and is illustrated in FIG. 2 as a clearance distance identified by distance A. This distance A is normally of the magnitude of one and one-half inches, but can vary with different sizes of wheels.

According to a particular feature of the present invention, the flange 28 extends a substantial distance outwardly from the mounting surfaces to prevent undesirable compression of a deflated tire between the rim and the roadway. This avoids damage to the tire occasioned by compression of the tire due to the weight of the vehicle resting on the rim.

It is also to be noted that the flange 28 is positioned in planar proximity with the mounting flange 16 so that upon failure of the tires, the flange 28 will be centrally positioned with respect to the rim. A tread 30 is attached to the exterior of the cylindrical surface of the flange 28 for use in contacting the road upon failure of the tires.

Figure 3:
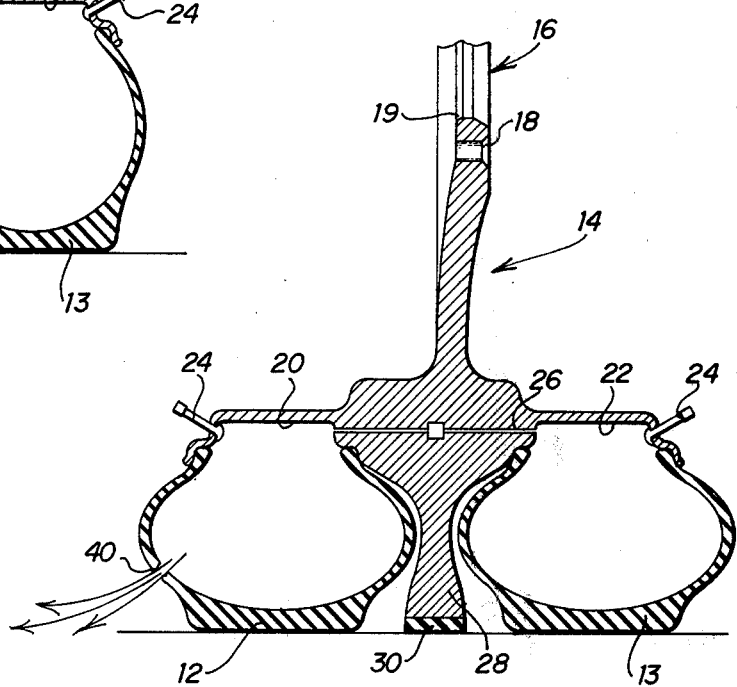
FIG. 3 is a view similar to FIG. 2 illustrating a device when one of the tires is punctured.

In FIG. 3, the wheel 10 is shown with the tire 12 with a blowout puncture 40 in the side thereof. This puncture 40 could be caused by contact of the tire 12 with a sharp object in the roadway. The puncture 40 allows air to quickly escape from the tire as shown by the arrows. This release of the air from the interior of the tire 12 will allow the tire to deflate, thus reducing its effective support radius. The other tire 13 will then support the vehicle for a short period of time (preferably one minute) while air flows through the restricted passageway 26 from the tire 13 to the tire 12 and out the puncture 40. The passageway 26 is selected to be of a size to control the flow between the two tires. The rate of flow is such that the air will slowly deflate the tire 13 to slowly lower the axle and change the effective radius of the wheel 14 until the treads 30 contact the roadway as illustrated in FIG. 3. This prevents an abrupt change in the effective radius of the wheel and gradually lowers the wheel 10 until treads 30 contact the roadway. In the present embodiment, this lowering process can extend up to one minute. In this position, the wheel has been lowered to the roadway and its effective radius shortened a distance A to allow contact with the roadway.

As can be seen, the passageway 26 not only maintains the tires 12 and 13 at an equal pressure during operation of the wheel, but also allows a controlled gradual lowering of the flange 28 if one of the tires should quickly lose its pressure. In addition, the flange 28 is positioned directly under the connection to the axle of the vehicle. This facilitates steering of the vehicle when the tire is in the deflated condition, illustrated in FIG. 3. In addition, the substantial outward extension of the flange 28 prevents damage to the tires 12 and 13 when deflated by reason of the rim squashing the tire wall between the roadway and the rim. This keeps the weight of the vehicle off of the deflated tire, and will not permit it to be flattened, crushed, or damaged any further by the wheel rim 14 or the flange 28.

It is to be understood, of course, that the foregoing disclosure relates only to the preferred embodiment of the present invention, and that numerous alterations may be utilized to practice the present invention without departing from the spirit and scope of the invention as defined in the appended claims.

What is claimed is:

1. A safety wheel comprising in combination a cylindrical rim, means on said rim facilitating attachment of said rim to the axle of a vehicle, a pair of parallel spaced mounting surfaces for mounting tires on said rim, a pair of pneumatic tires mounted on said rim in said mounting surfaces, inflation check valves attached to said rim for communicating, respectively, with the interior of each of said tires, a restricted flow passage formed in said rim communicating between the interior of said two tires for gradually changing the effective radius of said wheel upon sudden loss of pressure in one of said tires, and a flange on said rim between said mounting surfaces extending substantially outward in a radial direction for preventing damage to said tires when deflated by compression of said tires between said rim, flange and said roadway, a contact surface formed on the exterior of said flange, and a tread on said contact surface for contacting the road upon loss of support from both tires.

2. A safety wheel having a rim, a plurality of pneumatic tires mounted on said rim in a spaced parallel relationship, a first flange extending to the interior of said rim for attaching said rim to the lugs of an axle of a vehicle, and the improvement which comprises means to provide gradual lowering of the wheel upon loss of pressure in one of said pneumatic tires, and a second flange extending substantially outward from said rim for preventing damage to said tires when deflated by compression of said tires between said rim, said flange and said roadway.

3. The safety wheel of claim 2 wherein said means to provide gradual lowering comprises a port in said rim providing restricted flow passage between the interior of said pneumatic tires on said rim.

4. The wheel of claim 2 additionally comprising a contact surface on said second flange and tread means mounted on said contact surface for contacting the road upon loss of support from both tires.

* * * * *